United States Patent [19]

Mignard et al.

[11] Patent Number: 5,954,947
[45] Date of Patent: Sep. 21, 1999

[54] PROCESS FOR MILD HYDROCRACKING OF PETROLEUM CUTS USING A CATALYST CONTAINING AT LEAST TWO DEALUMINATED Y ZEOLITES

[75] Inventors: Samuel Mignard, Chatou; Nathalie George-Marchal, Paris; Eric Benazzi, Chatou; Slavik Kasztelan, Rueil Malmaison, all of France

[73] Assignee: Institut Francais du Petrole, France

[21] Appl. No.: 08/955,623

[22] Filed: Oct. 22, 1997

[30] Foreign Application Priority Data

Oct. 22, 1996 [FR] France .................. 96 12958

[51] Int. Cl.$^6$ ................................. C10G 47/20
[52] U.S. Cl. ................. 208/111.03; 208/111.01; 208/216 PP; 208/111.35; 208/114; 208/117
[58] Field of Search .................. 208/111, 216 PP

[56] References Cited

U.S. PATENT DOCUMENTS

| 3,830,725 | 8/1974 | Dolbear et al. . |
| 4,097,410 | 6/1978 | Gladrow . |
| 4,477,336 | 10/1984 | Scherzer . |
| 4,661,239 | 4/1987 | Steigleder ........................ 208/111 |
| 4,925,546 | 5/1990 | Kukes et al. . |

FOREIGN PATENT DOCUMENTS

| 0 287 718 | 10/1988 | European Pat. Off. . |
| 2 119 636 | 8/1972 | France . |
| 2 348 265 | 11/1977 | France . |

*Primary Examiner*—Helane Myers

[57] ABSTRACT

A mild hydroconversion process for petroleum cuts using a catalyst comprising at least one matrix, at least one Y zeolite with a lattice parameter which is in the range 24.15 Å to 24.38 Å (1 nm—10 Å), at least one Y zeolite with a lattice parameter of more than 24.38 Å and less than or equal to 24.51 Å, and at least one hydro-dehydrogenating element.

24 Claims, No Drawings

PROCESS FOR MILD HYDROCRACKING OF PETROLEUM CUTS USING A CATALYST CONTAINING AT LEAST TWO DEALUMINATED Y ZEOLITES

BACKGROUND OF THE INVENTION

The present invention concerns a process for mild hydroconversion of petroleum cuts using a catalyst comprising at least two dealuminated Y zeolites associated with a matrix which is normally amorphous or of low crystallinity.

Mild hydrocracking of heavy petroleum cuts is a refining process which produces, from surplus and heavy feeds of low upgradability, lighter fractions such as gasolines, aviation fuel and light gas oils which the refiner needs in order to adapt his production to demand. In comparison with catalytic cracking, catalytic hydrocracking is important for the production of improved quality middle distillates, aviation fuels and gas oils. In contrast, the gasoline produced has a much lower octane number than that from catalytic cracking.

The catalysts used in mild hydrocracking are all bifunctional, associating an acid function with a hydrogenating function. The acid function is provided by supports with large surface areas of fairly low superficial acidity, such as halogenated aluminas (in particular chlorinated or fluorinated aluminas), combinations of boron oxides and aluminium oxides, and amorphous silica-aluminas. The acidity is usually far lower than that of zeolites. The hydrogenating function is provided either by one or more metals from group VIII of the periodic table, such as iron, cobalt, nickel, ruthenium, rhodium, palladium, osmium, iridium and platinum, or by the association of at least one metal from group VI of the periodic table, such as chromium, molybdenum and tungsten, and at least one group VIII metal, preferably a non-noble metal.

The great majority of conventional mild hydrocracking catalysts contain weakly acidic supports, such as amorphous silica-aluminas. Amorphous silica-aluminas form a family of low acidity supports.

Many commercial mild hydrocracking catalysts contain silica-alumina associated with either a group VIII metal or, as is preferable when the quantity of heteroatomic poisons in the feed to be treated exceeds 0.5% by weight, with an association of sulphides of metals from groups VIB and VIII. Such systems have very good selectivity for middle distillates and the products formed are of quite good quality. The disadvantage of all of those catalytic systems based on an amorphous support is, as has already been stated, their low activity.

The present invention overcomes these disadvantages. It provides a mild hydroconversion process using a catalyst comprising at least one matrix, at least one Y zeolite, Y1, with a lattice parameter which is in the range 24.15 Å to 24.38 Å (1 nm=10 Å), at least one Y zeolite, Y2, with a lattice parameter of more than 24.38 Å and less than or equal to 24.51 Å, and at least one hydro-dehydrogenating element.

In the remainder of the text, the lattice parameter units will be expressed in Å (1 nm=10 Å).

The catalyst and support of the present invention thus comprises at least two Y zeolites with faujasite structure ("Zeolite Molecular Sieves: Structure, Chemistry and Uses", D. W. Breck, J. Wiley & Sons, 1973) which can either be in the hydrogen form or in a form which is partially exchanged with metal cations, for example with alkaline-earth metal cations and/or cations of rare earth metals with atomic number 57 to 71 inclusive. The first, known here as Y1, has a lattice parameter of more than 24.15 Å up to 24.38 Å. The second, known here as Y2, has a lattice parameter of more than 24.38 Å and less than or equal to 24.51 Å. The Y1/Y2 weight ratio, i.e., the ratio between the first and the second zeolite, is in the range 0.1 to 100, advantageously in the range 0.1 and 80, more advantageously in the range 0.1 to 50, preferably in the range 0.3 to 30, and more preferably in the range 0.5 to 10. The total weight content of the matrix with respect to the support (the support is constituted by the matrix and the totality of the Y zeolites) is in the range 20% to 99%, preferably in the range 25% to 98%, more preferably in the range 40% to 97% and advantageously in the range 65% to 95%.

The preferred acid zeolite Y1 is characterized by various specifications: a lattice parameter in the range 24.15 Å to 24.38 Å; a framework $SiO_2/Al_2O_3$ molar ratio, calculated using the Fichtner-Schmittler correlation (in Cryst. Res. Tech. 1984, 19, K1) in the range about 500 to 21; a sodium content of less than 0.15% by weight determined on zeolite calcined at 1100° C.; a sodium ion take-up capacity $C_{Na}$, expressed in grams of Na per 100 grams of modified, neutralised then calcined zeolite, of more than about 0.85; a specific surface area, determined using the BET method, of more than about 400 $m^2/g$, preferably more than 550 $m^2/g$; a water vapour adsorption capacity at 25° C. for a partial pressure of 2.6 torrs (i.e., 34.6 MPa) of more than about 6%, and a pore distribution wherein between 1% and 20%, preferably between 3% and 15%, of the pore volume is contained in pores with a diameter between 20 Å and 80 Å, the major part of the remainder of the pore volume being contained in pores with a diameter of less than 20 Å.

The other preferred acid zeolite Y2 is characterized by various specifications: a lattice parameter in the range 24.38 Å to 24.51 Å; a framework $SiO_2/Al_2O_3$ molar ratio, calculated using the Fichtner-Schmittler correlation (in Cryst. Res. Tech. 1984, 19, K1) of less than about 21 and greater than or equal to 10; a sodium content of less than 0.15% by weight determined on zeolite calcined at 1100° C.; a sodium ion take-up capacity $C_{Na}$, expressed in grams of Na per 100 grams of modified, neutralized then calcined zeolite, of more than about 0.85; a specific surface area, determined using the BET method, of more than about 400 $m^2/g$, preferably more than 550 $m^2/g$; a water vapor adsorption capacity at 25° C. for a partial pressure of 2.6 torrs (i.e., 34.6 MPa) of more than about 6%, and a pore distribution wherein between 1% and 20%, preferably between 3% and 15%, of the pore volume is contained in pores with a diameter between 20 Å and 80 Å, the major part of the remainder of the pore volume being contained in pores with a diameter of less than 20 Å.

The catalyst and support thus comprise at least these two zeolites Y1 and Y2 but it can contain more than two provided that these zeolites have the lattice parameters of Y1 or Y2.

Any method which can produce zeolites Y1 and Y2 having the characteristics defined above is suitable.

The catalyst of the present invention also comprises at least one matrix which is normally amorphous or of low crystallinity selected, for example, from the group formed by alumina, silica, magnesia, titanium oxide, zirconia, aluminium, titanium or zirconium phosphates, clay, boron oxide and combinations of at least two of these compounds.

The matrix is preferably selected from the group formed by silica, alumina, magnesia, silica-alumina combinations, and silica-magnesia combinations.

The catalyst of the present invention can be prepared using any of the methods known to the skilled person. It is advantageously obtained by mixing the matrix and zeolites then forming. The hydrogenating element is introduced during mixing, or it can be introduced after forming (preferred). Forming is followed by calcining, the hydrogenating element being introduced before or after calcining. In all cases, the preparation is finished by calcining at a temperature of 250° C. to 600° C. One preferred method consists of mixing Y zeolites of faujasite structural type in a wet alumina gel for several tens of minutes, then passing the paste obtained through a die to form extrudates with a preferred diameter of between 0.4 mm and 4 mm.

The catalyst also includes a hydrogenating function. The hydro-dehydrogenating function is provided by at least one group VIII metal or a compound of a group VIII metal, in particular nickel and cobalt. A combination of at least one metal or compound of a metal from group VI of the periodic table (in particular molybdenum or tungsten) and at least one metal or compound of a metal from group VIII in the periodic table, preferably a non noble metal (in particular cobalt or nickel), can be used. The hydrogenating function itself as defined above can be introduced into the catalyst at various stages of the preparation and in various ways.

It can be introduced only in part (for example for associations of oxides of group VI and group VIII metals) or in total when mixing the two zeolite types with the gel of the oxide selected as the matrix, the remainder of the hydrogenating element(s) then being introduced after mixing, and more generally after calcining. The group VIII metal is preferably introduced simultaneously with or after the group VI metal, whatever the method of introduction. It can be introduced in one or more ion exchange operations on the calcined support constituted by zeolites dispersed in the selected matrix, using solutions containing precursor salts of the selected metals when these are from group VIII. It can be introduced using one or more operations to impregnate the formed and calcined support with a solution of precursors of oxides of group VIII metals (in particular cobalt and nickel) when the precursors of oxides of metals from group VI (in particular molybdenum or tungsten) have been introduced on mixing the support. Finally, it can be introduced by one or more operations to impregnate the calcined support, constituted by zeolites and the matrix, with solutions containing precursors of oxides of group VI and/or group VIII metals, the precursors of oxides of group VIII metals preferably being introduced after those of group VI or at the same time as the latter.

When the elements are introduced by impregnating several times with the corresponding precursor salts, intermediate calcining of the catalyst must be carried out at a temperature which is in the range 250° C. to 600° C.

The total concentration of oxides of group VIII and VI metals is in the range 1% to 40% by weight of the catalyst obtained after calcining, preferably in the range 3% to 30% and advantageously in the range 8% to 40%, more advantageously 10% to 40% and even more advantageously, 10% to 30%. The ratio of group VI metal(s) to group VIII metal(s) is generally in the range 20 to 1.25, preferably in the range 10 to 2, expressed by weight as the metal oxides. The catalyst can also contain phosphorous. The concentration of phosphorous oxide ($P_2O_5$) is generally in the range 0.1% to 15%, preferably in the range 0.15% to 10% by weight.

Impregnation of molybdenum can be facilitated by adding phosphoric acid to the molybdenum salt solutions.

The catalysts obtained, in the form of oxides, can optionally be at least partially changed into the metallic or sulphide form.

They are charged into the reactor and used for mild hydrocracking, in particular of heavy cuts. Their activity is improved compared with the prior art.

The petroleum cuts to be treated have boiling points of more than 100° C. Examples are kerosines, gas oils, vacuum distillates, deasphalted or hydrotreated residues, or equivalents thereof. The feeds, which are highly charged with N and S, are preferably hydrotreated first. The heavy cuts are preferably constituted by at least 80% by volume of compounds with boiling points of at least 350° C., preferably between 350° C. and 580° C. (i.e., corresponding to compounds containing at least 15 to 20 carbon atoms). They generally contain heteroatoms such as sulphur and nitrogen. The nitrogen content is usually in the range 1 to 5000 ppm by weight and the sulphur content is in the range 0.01% to 5% by weight. Hydrocracking conditions, such as temperature, pressure, hydrogen recycle ratio, and hourly space velocity, can vary depending on the nature of the feed, the quality of the desired products, and the facilities available to the refiner.

When hydrotreatment is necessary, the petroleum cut conversion process is carried out in two steps, the catalysts of the invention being used in the second step.

Catalyst 1 of the first hydrotreatment step comprises a matrix, preferably based on alumina, and preferably containing no zeolite, and at least one metal with a hydro-dehydrogenating function. This matrix can also be constituted by, or include, silica, silica-alumina, boron oxide, magnesia, zirconia, titanium oxide or a combination of these oxides. The hydro-dehydrogenating function is provided by at least one metal or compound of a metal from group VIII of the periodic table such as nickel or cobalt. A combination of at least one metal or compound of a metal from group VI of the periodic table (in particular molybdenum or tungsten) and at least one metal or compound of a metal from group VIII (in particular cobalt or nickel) from the periodic table can be used. The total concentration of oxides of group VI and group VIII metals is in the range 5% to 40% by weight, preferably in the range 7% to 30% by weight, and the ratio of group VI metal(s) to group VIII metal(s) is in the range 1.25 to 20, preferably in the range 2 to 10, expressed by weight as the metal oxides. The catalyst can also contain phosphorous. The phosphorous content, expressed as the concentration of diphosphorous pentoxide $P_2O_5$, is generally at most 15%, preferably in the range 0.1% to 15%, and more preferably in the range 0.15% to 10% by weight.

The first step is generally carried out at a temperature of 350° C. to 460° C., preferably 360° C. to 450° C., at a total pressure of 2 MPa to less than 8 MPa, preferably 2 MPa to 7 MPa, an hourly space velocity of 0.1 to 5 $h^{-1}$, preferably 0.2 to 2 $h^{-1}$, and with a quantity of hydrogen of at least 100Nl/Nl of feed, preferably 260–2000 Nl/Nl of feed.

In the case of the conversion step using the catalyst of the invention (second step), the temperatures are generally 230° C. or more, usually in the range 350° C. to 470° C., preferably in the range 350° C. to 460° C. The pressure is 2 MPa or more, generally more than 2.5 MPa. The pressure is less than 8 MPa and generally less than or equal to 7 MPa. The quantity of hydrogen is a minimum of 100l/1 of feed, usually in the range 150 to 1500 l/l of hydrogen per litre of feed. The hourly space velocity is generally in the range 0.15 to 10 $h^{-1}$.

The parameters which are important to the refiner are the activity and selectivity towards middle distillates. Fixed targets must be achieved under conditions which are compatible with economic reality. Under conventional hydrocracking conditions, this type of catalyst can produce selectivities of more than 65%, and generally more than 75%, with levels of conversion of more than 25% or 30% and generally less than 60%. Finally, because of the composition of the catalyst, it can readily be regenerated.

Surprisingly, we have been able to establish that, in accordance with the invention, a catalyst containing at least two dealuminated Y zeolites can produce a selectivity for middle distillates which is substantially improved compared with prior art catalysts. The following examples illustrate the present invention without in any way limiting its scope.

EXAMPLES

Example 1
Production of Catalyst C1

Catalyst C1 was produced as follows: 20% by weight of a Y zeolite with a lattice parameter of 24.42 Å was used, mixed with 80% by weight of SB3 type alumina from Condéa. The mixed paste was then extruded through a 1.4 mm diameter die. The extrudates were dried overnight at 120° C. in air then calcined at 550° C. in air. The extrudates were dry impregnated using a solution of a mixture of ammonium heptamolybdate, nickel nitrate and orthophosphoric acid, dried overnight at 120° C. in air then calcined in air at 550° C. The concentrations of active oxides were as follows (with respect to the catalyst):

2.6% by weight of nickel oxide NiO;

12.7% by weight of molybdenum oxide $MoO_3$;

5.5% by weight of phosphorous oxide $P_2O_5$.

Example 2
Production of Catalyst C2.

Catalyst C2 was produced as follows: 20% by weight of a Y zeolite with a lattice parameter of 24.28 Å was used, mixed with 80% by weight of SB3 type alumina from Condéa. The mixed paste was then extruded through a 1.4 mm diameter die. The extrudates were dried overnight at 120° C. in air then calcined at 550° C. in air. The extrudates were dry impregnated using a solution of a mixture of ammonium heptamolybdate, nickel nitrate and orthophosphoric acid, dried overnight at 120° C. in air then calcined in air at 550° C. The concentrations of active oxides were as follows (with respect to the catalyst):

2.7% by weight of nickel oxide NiO;

12.8% by weight of molybdenum oxide $MoO_3$;

5.4% by weight of phosphorous oxide $P_2O_5$.

Example 3
Production of Catalyst C3

Catalyst C3 was produced as follows: 10% by weight of a Y zeolite with a lattice parameter of 24.42 Å and 10% by weight of a Y zeolite with a lattice parameter of 24.28 Å were used, mixed with 80% by weight of SB3 type alumina from Condéa. The mixed paste was then extruded through a 1.4 mm diameter die. The extrudates were dried overnight at 120° C. in air then calcined at 550° C. in air. The extrudates were dry impregnated using a solution of a mixture of ammonium heptamolybdate, nickel nitrate and orthophosphoric acid, dried overnight at 120° C. in air then calcined in air at 550° C. The concentrations of active oxides were as follows (with respect to the catalyst):

2.6% by weight of nickel oxide NiO;

12.7% by weight of molybdenum oxide $MoO_3$;

5.4% by weight of phosphorous oxide $P_2O_5$.

Example 4
Comparison of C1, C2 and C3

The catalysts prepared as in the preceding examples were used under mild hydrocracking conditions on a petroleum feed with the following principal characteristics:

| | |
|---|---|
| Initial point | 277° C. |
| 10% point | 381° C. |
| 50% point | 482° C. |
| 90% point | 531° C. |
| End point | 545° C. |
| Pour point | +39° C. |
| Density (20/4) | 0.919 |
| Sulphur (% by weight) | 2.46 |
| Nitrogen (ppm by weight) | 930 |

The catalytic test unit comprised two fixed bed reactors operating in upflow mode. 40 ml of catalyst was introduced into each catalyst. A first hydrotreatment step catalyst 1, HR360 sold by Procatalyse, comprising a group VI element and a group VIII element deposited on alumina, was introduced into the first reactor, into which the feed was initially fed. A second step catalyst 2, i.e., the hydroconversion catalyst, was introduced into the second reactor, into which the feed was finally fed. The two catalysts underwent in-situ sulphurisation before the reaction. It should be noted that any in-situ or ex-situ sulphurisation method would have been suitable. Once sulphurisation had been carried out, the feed described above could be transformed. The total pressure was 5 MPa, the hydrogen flow rate was 500 litres of gaseous hydrogen per litre of feed injected, and the hourly space velocity was 0.5 $h^{-1}$.

The catalytic performances were expressed as the gross conversion at 400° C. and as the gross selectivity. These catalytic performances were measured on the catalyst after a period of stabilisation had passed, generally at least 48 hours.

The gross conversion, GC, is defined as:

$$GC = \frac{\% \text{ by weight of } 380 + \text{effluents}}{100}$$

The gross selectivity, GS, is defined as:

$$GS = \frac{(\text{weight } 150/380 \text{ effluents})}{(\text{weight } 380 - \text{effluents})} * 100$$

The following table shows the gross conversion at 400° C. and the gross selectivity for the three catalysts.

| | GC (% by weight) | GS |
|---|---|---|
| C1 | 55.5 | 77.3 |
| C2 | 45.3 | 82.5 |
| C3 | 49.6 | 82.4 |

Using a mixture of zeolites produced a high level of conversion and very high selectivity, substantially higher than that of catalyst C1 and the same as that of catalyst C2, while the level of conversion was high: a gain of 4.3% by weight over catalyst C2 was observed.

We claim:

1. A process for the conversion of a petroleum cut comprising contacting the cut with a catalyst comprising at least one matrix, at least one Y zeolite (Y1) with a lattice parameter of 24.15 Å to 24.38 Å, at least one Y zeolite (Y2)

with a lattice parameter of more than 24.38 Å and less than or equal to 24.51 Å, and at least one hydro-dehydrogenating element, in the presence of a quantity of hydrogen.

2. A process according to claim 1, in which the cut has first undergone hydrotreatment.

3. A process according to claim 2, in which the hydrotreatment catalyst comprises a matrix which is alumina, silica, boron oxide, magnesia, zirconia, titanium oxide or a combination thereof, and at least one metal having a hydro-dehydrogenating function, which is a group VI or group VIII metal, the total concentration of oxides of said metal being 5% to 40% by weight, the weight ratio of group VI metal oxides to group VIII metal oxides being 1.25 to 20, and the catalyst optionally containing at most 15% by weight of diphosphorous pentoxide.

4. A process according to claim 2, in which hydrotreatment takes place at a temperature of between 350–460° C., at a pressure of at least 2 MPa to less than 8 MPa, with a quantity of hydrogen of at least 100 Nl/l of feed and an hourly space velocity of 0.1–5 $h^{-1}$.

5. A process according to claim 1, in which the cut contains at least 80% by volume of compounds with boiling points of at least 350° C.

6. A process according to claim 1, in which the petroleum cut is a gas oil, a vacuum distillate, a deasphalted residue or a hydrotreated residue.

7. A process according to claim 1, in which the conversion catalyst comprises a matrix which is alumina, silica, magnesia, titanium oxide, zirconium oxide an aluminium phosphate, a titanium phosphate, a zirconium phosphate, boron oxide, clay or a mixture thereof.

8. A process according to claim 1, in which the hydro-dehydrogenating element is an element from group VIII or an element from group VI of the periodic table.

9. A process according to claim 1, in which the content of the matrix in the catalyst support is 20% to 98% by weight.

10. A process according to claim 1, in which the Y1/Y2 weight ratio is 0.1 to 100.

11. A process according to claim 1, in which the Y1/Y2 weight ratio is 0.3 to 30.

12. A process according to claim 1, in which the catalyst contains 1% to 40% by weight of oxides in the totality of the hydrogenating elements.

13. A process according to claim 1, in which the catalyst further contains 0.1% to 15% by weight of diphosphorous pentoxide.

14. A process according to claim 1, in which the catalyst is prepared by mixing the zeolites with the matrix, introducing at least a portion of the hydro-dehydrogenating elements, forming then calcining.

15. A process according to claim 1, in which the catalyst is prepared by mixing the zeolites and the matrix, forming, calcining then introducing the hydro-dehydrogenating element(s).

16. A process according to claim 1, in which the catalyst is prepared by mixing the zeolites with the matrix, forming, introducing the hydro-dehydrogenating element(s), then calcining.

17. A process according to claim 14, in which the hydro-dehydrogenating group VIII element(s) is/are introduced after or simultaneously with the introduction of the hydro-dehydrogenating group VI element(s).

18. A process according to claim 1 with a sulphurized catalyst.

19. A process according to claim 1, conducted at a temperature of at least 230° C., a pressure of at least 2 MPa and less than 8 MPa, a quantity of hydrogen of at least 100 Nl/l of feed and an hourly space velocity of 0.15 to $10h^{-1}$.

20. A process according to claim 1, further comprising mixing the zeolites and the matrix, forming, calcining then introducing the hydro-dehydrogenating elements(s), prior to contacting with the cut.

21. A process according to claim 1, further comprising mixing the zeolites and the matrix, forming, introducing the hydro-dehydrogenating elements(s), then calcining, prior to contacting with the cut.

22. A process according to claim 1, wherein (Y1) has a lattice parameter of 24.28 to 24.38 and (Y2) has a lattice parameter of 24.42 to 24.51.

23. A process according to claim 1, wherein (Y1) has a lattice parameter of 24.15 to 24.28 and (Y2) has a lattice parameter of 24.42 to 24.51.

24. A process according to claim 1, wherein (Y1) has a lattice parameter of 24.28 and (Y2) has a lattice parameter of 24.42.

* * * * *